(12) United States Patent
Wu

(10) Patent No.: US 12,478,229 B2
(45) Date of Patent: Nov. 25, 2025

(54) CLEANING METHOD, WINDOW WIPING ROBOT, AND STORAGE MEDIUM

(71) Applicant: ECOVACS HOME SERVICE ROBOTICS CO., LTD., Suzhou (CN)

(72) Inventor: Fei Wu, Suzhou (CN)

(73) Assignee: ECOVACS HOME SERVICE ROBOTICS CO., LTD., Suzhou (CN)

( * ) Notice: Subject to any disclaimer, the term of this patent is extended or adjusted under 35 U.S.C. 154(b) by 418 days.

(21) Appl. No.: 17/606,287

(22) PCT Filed: Mar. 19, 2020

(86) PCT No.: PCT/CN2020/080289
§ 371 (c)(1),
(2) Date: Oct. 25, 2021

(87) PCT Pub. No.: WO2020/215945
PCT Pub. Date: Oct. 29, 2020

(65) Prior Publication Data
US 2022/0192444 A1 Jun. 23, 2022

(30) Foreign Application Priority Data
Apr. 26, 2019 (CN) .......................... 201910346404.9

(51) Int. Cl.
*A47L 1/02* (2006.01)
*B08B 1/14* (2024.01)
(Continued)

(52) U.S. Cl.
CPC ................ *A47L 1/02* (2013.01); *B08B 1/143* (2024.01); *B08B 1/30* (2024.01); *B08B 13/00* (2013.01);
(Continued)

(58) Field of Classification Search
CPC ... A47L 1/02; A47L 9/28; B08B 1/006; B08B 1/008; B08B 13/00; G05D 1/0219; G05D 1/0227; G05D 2201/0203
See application file for complete search history.

(56) References Cited

U.S. PATENT DOCUMENTS 5,903,124 A * 5/1999 Kawakami ........... G05D 1/0227
318/587
6,809,490 B2 * 10/2004 Jones ................... G05D 1/0219
318/568.17
(Continued)

FOREIGN PATENT DOCUMENTS

CN 1535646 A 10/2004
CN 102591340 A 7/2012
(Continued)

OTHER PUBLICATIONS

Hobottek, "HOBOT-168 Window Cleaning Robot", Figures 1-8 captured from Youtube.com, https://www.youtube.com/watch?v=z3KZA5abHDo (Year: 2023).*
(Continued)

*Primary Examiner* — Duy Vu N Deo
*Assistant Examiner* — Christopher Remavege
(74) *Attorney, Agent, or Firm* — Maschoff Brennan

(57) ABSTRACT

Embodiments of the present disclosure provide a cleaning method, a window wiping robot, and a storage medium. According to the embodiments of the present disclosure, when a window wiping task needs to be performed, the window wiping robot firstly spins to detect a boundary of a glass window to be cleaned. If the boundary of the glass window to be cleaned is detected during spinning, the window wiping robot performs the window wiping task directly along the boundary. The cleaning mode may save the boundary detection time and help to improve the clean-
(Continued)

ing efficiency when starting to perform the window wiping task without detecting the boundary up, down, left, and right.

21 Claims, 7 Drawing Sheets

(51) Int. Cl.
*B08B 1/30* (2024.01)
*B08B 13/00* (2006.01)
*G05D 1/00* (2024.01)

(52) U.S. Cl.
CPC ......... *G05D 1/0219* (2013.01); *G05D 1/0227* (2013.01)

(56) References Cited

U.S. PATENT DOCUMENTS

| | | | | |
|---|---|---|---|---|
| 7,173,391 | B2 * | 2/2007 | Jones | G05D 1/0219 701/1 |
| 7,515,991 | B2 | 4/2009 | Egawa et al. | |
| 9,408,514 | B1 | 8/2016 | Alexander | |
| 2011/0202175 | A1 | 8/2011 | Romanov | |
| 2017/0071435 | A1 | 3/2017 | Jeong | |
| 2017/0164797 | A1 * | 6/2017 | Abramson | B62D 57/024 |
| 2018/0178391 | A1 * | 6/2018 | Naito | B25J 9/0003 |
| 2018/0310794 | A1 * | 11/2018 | Zhang | A47L 11/4061 |
| 2020/0238342 | A1 * | 7/2020 | Chao | A47L 1/02 |
| 2020/0246970 | A1 * | 8/2020 | Chao | B08B 3/024 |

FOREIGN PATENT DOCUMENTS

| | | | | |
|---|---|---|---|---|
| CN | 103844992 | A | | 6/2014 |
| CN | 106343914 | A * | | 1/2017 |
| CN | 106419720 | A | | 2/2017 |
| CN | 107149435 | | | 9/2017 |
| CN | 107149435 | A * | | 9/2017 |
| CN | 107328419 | A | | 11/2017 |
| CN | 107518833 | A | | 12/2017 |
| CN | 206822588 | U | | 1/2018 |
| CN | 107748565 | A * | 3/2018 | B08B 1/001 |
| CN | 107997669 | A | | 5/2018 |
| CN | 109124499 | A | | 1/2019 |
| CN | 109129499 | A | | 1/2019 |
| CN | 111110121 | A * | | 5/2020 |
| CN | 109129499 | B * | 9/2020 | B25J 11/0085 |
| CN | 114431758 | A * | | 5/2022 |
| DE | 102016105171 | A1 | | 9/2017 |
| JP | 2000039918 | A | | 2/2000 |
| JP | 2017007372 | A | | 1/2017 |
| KR | 20090018336 | A | | 2/2009 |
| KR | 102591336 | B1 | | 10/2023 |
| TW | 200534821 | A | | 11/2005 |
| WO | 2018056492 | A1 | | 3/2018 |

OTHER PUBLICATIONS

Wayback Machine, HOBOT-168 Window Cleaning Robot"Hobot-Tek" available online Dec. 10, 2018, https://web.archive.org/web/20181210051157/https://www.youtube.com/watch?v=z3KZA5abHDo (Year: 2018).*
Hobot-168 User's Manual ("Hobot-168 Glass Cleaning Robot User's Manual", Copyright 2012). (Year: 2012).*
Liu, CN-109129499-B, Machine translation. (Year: 2023).*
Tang, CN-107149435-A, Machine translation. (Year: 2023).*
Zhang, CN-107748565-A, Machine translation. (Year: 2023).*
Hobot 168 User Manual (Year: 2012).*
WayBack Machine, HobotTek-168 Window Cleaning Robot, Youtube video (Year: 2018).*
Hobot-168 Demonstration ("Robotic window cleaner HOBOT-168 in the show Rady ptáka Loskutáka", available on YouTube, Mar. 12, 2014, https://www.youtube.com/watch?v=Y9TIG6s2htM&t=101s) (Year: 2025).*
CN-106343914-A, Machine Translation. (Year: 2025).*
CN-111110121-A, Machine Translation. (Year: 2025).*
CN-114431758-A, Machine Translation. (Year: 2025).*
CN Second Office Action dated Oct. 12, 2021 as received in Application No. 201910346404.9.
CN Examination Rejection dated Mar. 31, 2022 as received in Application No. 201910346404.9.
CN Third Office Action dated Aug. 5, 2022 as received in Application No. 201910346404.9.
Chinese Office Action dated Mar. 16, 2021 as received in application No. 201910346404.9.
HOBOT-168 Window Cleaning Robot, https://www.youtube.com/watch?v=8C4LbWIEKWM.
Hobot-168 Glass Cleaning Robot User's Manual, Copyright 2012.

* cited by examiner

CLEANING METHOD, WINDOW WIPING ROBOT, AND STORAGE MEDIUM

TECHNICAL FIELD

The present disclosure relates to the technical field of artificial intelligence, and in particular to a cleaning method, a window wiping robot, and a storage medium.

BACKGROUND

With the development of an artificial intelligence technology, cleaning robots, such as floor sweeping robots, window wiping robots, or cleaning machines, gradually enter people's daily life, which bring great convenience to people's life. In particular, the window wiping robots not only liberate people from heavy household chores, but also reduce the risk of aerial work. However, the cleaning efficiency of existing window wiping robots is low.

SUMMARY

Aspects of the present disclosure provide a cleaning method, a window wiping robot, and a storage medium for improving the cleaning efficiency of the window wiping robot.

Embodiments of the present disclosure provide a cleaning method, including:
if a window wiping task needs to be performed, controlling a window wiping robot to spin to detect a boundary of a glass window to be cleaned; and
if a first boundary of the glass window to be cleaned is detected during spinning of the window wiping robot, controlling the window wiping robot to perform the window wiping task along the first boundary.

Embodiments of the present disclosure also provide a window wiping robot, including: a machine body provided with one or more processors and one or more memories for storing computer instructions.

The one or more processors are configured to execute the computer instructions for:
if a window wiping task needs to be performed, controlling a window wiping robot to spin to detect a boundary of a glass window to be cleaned; and
if a first boundary of the glass window to be cleaned is detected during spinning of the window wiping robot, controlling the window wiping robot to perform the window wiping task along the first boundary.

Embodiments of the present disclosure also provide a computer-readable storage medium, storing computer instructions. The computer instructions, when executed by one or more processors, cause the one or more processors to perform actions including:
if a window wiping task needs to be performed, controlling a window wiping robot to spin to detect a boundary of a glass window to be cleaned; and
if a first boundary of the glass window to be cleaned is detected during spinning of the window wiping robot, controlling the window wiping robot to perform the window wiping task along the first boundary.

According to the embodiments of the present disclosure, when a window wiping task needs to be performed, the window wiping robot firstly spins to detect a boundary of a glass window to be cleaned. If the boundary of the glass window to be cleaned is detected during spinning, the window wiping robot performs the window wiping task directly along the boundary. The cleaning mode can save the boundary detection time and help to improve the cleaning efficiency when starting to perform the window wiping task without detecting the boundary up, down, left, and right.

BRIEF DESCRIPTION OF THE DRAWINGS

The drawings described herein are used to provide a further understanding of the present disclosure and constitute a part of the present disclosure. The example embodiments of the present disclosure and the descriptions thereof are used to explain the present disclosure, and do not constitute an improper limitation on the present disclosure. In the drawings.

DETAILED DESCRIPTION OF EXAMPLE EMBODIMENTS

Figure 1A:
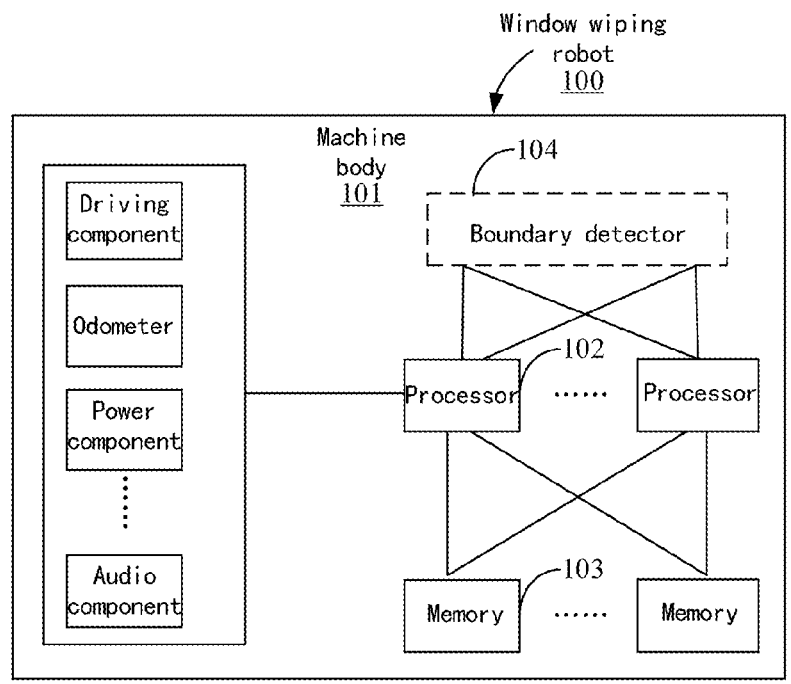
FIG. 1a is a block diagram showing a hardware structure of a window wiping robot according to an embodiment of the present disclosure.

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

An existing window wiping robot starts to perform a window wiping task by first detecting boundaries of a glass window to be cleaned and then selecting a cleaning mode. However, the window wiping robot takes a lot of time to detect the boundaries of the glass window to be cleaned, and the cleaning efficiency is low.

With regard to the technical problem of low cleaning efficiency of the existing window wiping robot, the embodiments of the present disclosure provide a solution with a basic idea as follows. When a window wiping task needs to be performed, the window wiping robot firstly spins to detect at least one boundary of a glass window to be cleaned. If at least one boundary of the glass window to be cleaned is detected during spinning, the window wiping robot performs the window wiping task directly along the detected boundary. The cleaning mode may save the boundary detection time and help to improve the cleaning efficiency when starting to perform the window wiping task without detecting all the boundaries, the up, down, left, and right.

The technical solutions provided by the embodiments of the present disclosure are described in detail below with reference to the drawings.

It should be noted that like reference numerals refer to like objects in the following drawings and embodiments, and thus, once an object is defined in one drawing or embodiment, further discussion thereof is not required in subsequent drawings and embodiments.

FIG. 1a is a block diagram of a hardware structure of a window wiping robot according to an exemplary embodiment of the present disclosure. As shown in FIG. 1a, the window wiping robot 100 includes a machine body 101. The machine body 101 is provided with one or more processors 102 and one or more memories 103 for storing computer instructions. It should be noted that the one or more processors 102 and the one or more memories 103 may be provided inside the machine body 101 or may be provided on a surface of the machine body 101.

Figure 1B:
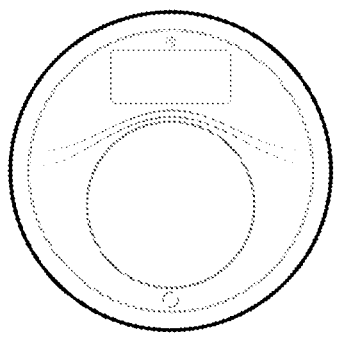
FIGS. 1b to 1e are schematic diagrams showing an appearance and shape of a window wiping robot according to an embodiment of the present disclosure.
Figure 1C:
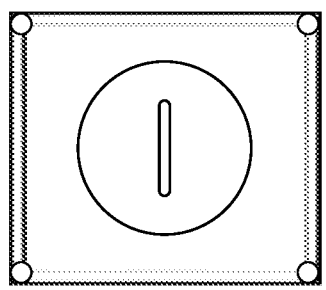
Figure 1D:
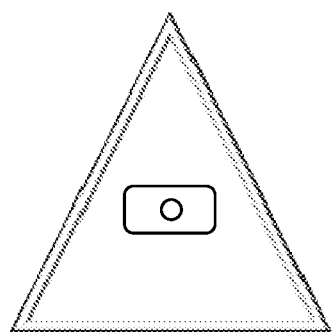
Figure 1E:
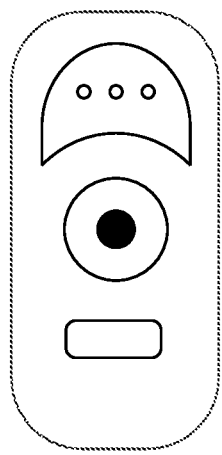

The machine body 101 is an actuator of the window wiping robot 100 that may perform operations specified by the processor 102 in certain environments. The machine body 101 reflects an appearance of the window wiping robot 100 to some extent. In the present embodiment, the appearance of the window wiping robot 100 is not limited. For example, the window wiping robot 100 may be a circular robot as shown in FIG. 1b, a square robot as shown in FIG. 1c, a triangular robot as shown in FIG. 1d, or a rounded rectangular robot as shown in FIG. 1e. The appearance of the window wiping robot 100 described above is exemplified only in the shape of a top view thereof. The machine body 101 mainly refers to a body of the window wiping robot 100.

It should be noted that some basic components of the window wiping robot 100, such as a driving component, an odometer, a power component, and an audio component, are also provided on the machine body 101. Optionally, the driving component may include a driving wheel, a driving motor, a universal wheel, a triangular track wheel, or a Mecanum wheel, etc. The basic components and the composition of the basic components contained in different window wiping robots 100 are different, and only some examples are listed in the embodiments of the present disclosure.

The power component is configured to supply power to various components of the window wiping robot. The power component may include a power management system, one or more power supplies, and other components associated with generation, management, and distribution of power for a device in which the power component is located.

The audio component may be configured to output and/or input an audio signal. For example, the audio component includes a microphone (MIC) configured to receive an external audio signal when a device in which the audio component is located is in an operational mode, such as a call mode, a recording mode, and a speech recognition mode. The received audio signal may be further stored in a memory or transmitted via a communication component. In some embodiments, the audio component further includes a loudspeaker for outputting the audio signal. For example, a window wiping robot having a language interaction function may implement speech interaction with a user through the audio component, etc.

The window wiping robot 100 may also include a cleaning component. The cleaning component may include a water storage tank, cleaning cloth, or a brush, etc. In an optional embodiment, water in the water storage tank is sucked by a water suction pump and evenly drips on the cleaning cloth, or water in the water storage tank drips on the cleaning cloth directly; or water in the water storage tank is atomized by an atomizer to form a water mist which is sprayed against a surface to be cleaned to soften dust.

In the present embodiment, the one or more memories 103 are configured primarily to store one or more computer instructions that are executable by the one or more processors 102 to cause the one or more processors 102 to control the window wiping robot 100 to implement corresponding functions and perform corresponding actions or tasks. In addition to storing computer instructions, the one or more memories 103 may be configured to store various other data to support operations on the window wiping robot 100. Examples of such data include instructions for any application or method operated on the window wiping robot 100.

The one or more memories 103 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The one or more processors 102, which may be regarded as a control system of the window wiping robot 100, may be configured to execute the computer instructions stored in the one or more memories 103 to control the window wiping robot 100 to implement corresponding functions and to perform corresponding actions or tasks. It should be noted that when the window wiping robot 100 is in different scenarios, the functions to be implemented and the actions or tasks to be performed thereby will be different. Accordingly, the computer instructions stored in the one or more memories 103 may vary, and execution of different computer instructions by the one or more processors 102 may control the window wiping robot 100 to implement different functions and perform different actions or tasks.

Figure 1F:
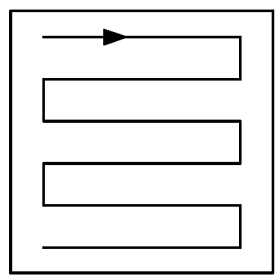
FIGS. 1f to 1k are schematic diagrams showing a cleaning mode of a window wiping robot according to an embodiment of the present disclosure.
Figure 1G:
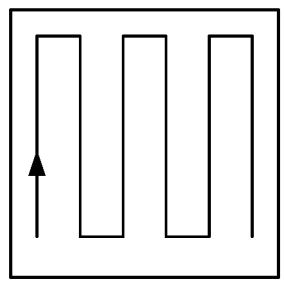
Figure 1H:
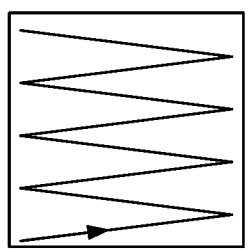
Figure 1I:
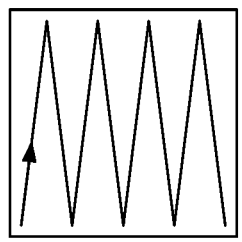
Figure 1J:
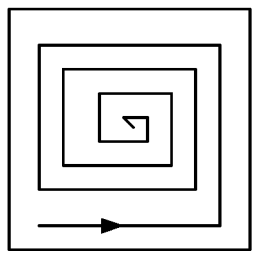
Figure 1K:
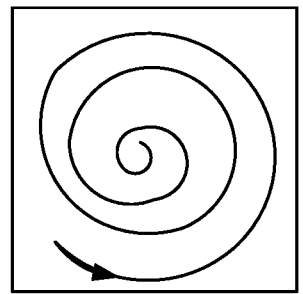

In the present embodiment, the window wiping robot 100 may move autonomously and perform a window wiping task on the basis of the autonomous movement. In the present embodiment, the processor 102 executes the computer instructions in the memory 103 to control the window wiping robot 100 to spin to detect a boundary of glass to be cleaned when the window wiping robot 100 needs to perform a window wiping task. Further, if the window wiping robot 100 detects the boundary of the glass to be cleaned during spinning, the window wiping robot 100 is controlled to perform the window wiping task along the detected boundary. In the embodiments of the present disclosure, for ease of description and distinction, the boundary of the glass to be cleaned, which is detected by the window wiping robot 100 during spinning, is defined as a first boundary. With regard to a glass window with a frame, the first boundary may be any frame of the glass window to be cleaned. With regard to a glass window without a frame, the first boundary may be either edge of the glass window to be cleaned. The window wiping robot 100 performing the window wiping task along the detected first boundary means that the window wiping robot 100 moves forward along the first boundary and wipes the glass window to be cleaned with the cleaning component (e.g., cleaning cloth) thereof during the movement. The window wiping robot 100 may be spaced from or in close contact with the first boundary during forward movement along the first boundary. When the window wiping robot 100 performs the window wiping task along the first boundary, the distance from the first boundary may be set according to the performance of the window wiping robot 100. It is theorized that when the window wiping robot 100 performs the window wiping task along the first boundary, it is advantageous to improve the cleaning effect of the boundary when the window wiping robot abuts against the first boundary. Accordingly, if the window wiping robot 100 does not detect a first boundary of the glass window to be cleaned during spinning, the processor 102 controls the window wiping robot 100 to perform the window wiping task in a set cleaning mode in any direction. In the embodiments of the present disclosure, the cleaning mode means that the window wiping robot 100 performs the window wiping task according to a set cleaning route. The cleaning mode includes: at least one of a bow-shaped cleaning mode (shown in FIGS. 1f and 1g), a "Z"-shaped cleaning mode (shown in FIG. 1h), an "N"-shaped cleaning mode (shown in FIG. 1i), a hollow square-shaped cleaning mode (shown in FIG. 1j), and an arc-shaped cleaning mode (shown in FIG. 1k).

In the present embodiment, when a window wiping task needs to be performed, the window wiping robot firstly spins to detect a boundary of a glass window to be cleaned. If the boundary of the glass window to be cleaned is detected during spinning, the window wiping robot performs the window wiping task directly along the boundary. The cleaning mode may save the boundary detection time and help to improve the cleaning efficiency when starting to perform the window wiping task without detecting the boundary up, down, left, and right.

It should be noted that different implementations may be used to determine whether the window wiping robot 100 needs to perform the window wiping task for different application scenarios. Some common application scenarios are exemplified below.

Application Scenario 1: When a person daily uses a window wiping robot, the window wiping robot 100 is generally placed on a glass window to be cleaned, and then the window wiping robot 100 is triggered to power on, and the window wiping robot 100 performs a window wiping task after power-on. Optionally, the user may send a power-on instruction to the window wiping robot 100 via a remote control to trigger the window wiping robot 100 to power on. Or, the user may press a power-on button on the window wiping robot 100 to trigger the window wiping robot 100 to power on. Whichever power-on mode is employed, in Application Scenario 1, the processor 102 of the window wiping robot 100 determines that a window wiping task needs to be performed upon detecting the power-on instruction.

Application Scenario 2: In some application scenarios, the window wiping robot 100 may fail during the window wiping task, resulting in loss of previous data. In order to facilitate being able to continue the window wiping task in a correct manner, the window wiping robot 100 needs to re-determine a boundary of the glass window to be cleaned. In this application scenario, the window wiping robot 100 determines that a window wiping task needs to be performed when detecting state recovery. For example, when the window wiping robot 100 temporarily shuts down and then restarts due to failure, the processor 102 of the window wiping robot 100 determines that a window wiping task needs to be performed when a restart instruction is detected.

Application Scenario 3: In everyday life, after the window wiping robot has completed a task of cleaning one glass window, people often pick up the window wiping robot from the cleaned glass window and re-place it on another glass window to be cleaned, and the window wiping robot starts to perform the window wiping task on the glass window onto which the window wiping robot is put down. Based on this, when detecting that the window wiping robot 100 is re-placed onto the glass window, the processor 102 determines that the window wiping task needs to be performed by the window wiping robot 100.

Optionally, in Application Scenario 3, a contact sensor, a reflective optical coupler, an inertial sensor, or the like may be provided on the window wiping robot 100 to detect whether the window wiping robot 100 is picked up and re-put down during use. For example, the bottom of a base or rollers of the window wiping robot 100 may be provided with a contact sensor for detecting whether the window wiping robot 100 is moved and suspended under the control of the one or more processors 102, and also for determining whether the window wiping robot 100 returns to the ground. Or, a reflective optical coupler may be installed at the bottom of the window wiping robot 100, and the reflective optical coupler emits a beam that may be reflected from the ground, through which the operation of the window wiping robot 100 being moved or suspended and then returned to the glass window may be detected. The one or more processors 102 are triggered to initiate a repositioning function when the contact sensor or the reflective optical coupler detects that the window wiping robot 100 is re-placed onto the glass window. As another example, an inertial sensor, such as an acceleration sensor, is installed on the machine body 101 of the window wiping robot 100 to detect whether the window wiping robot 100 is dragged with a wide range, thereby determining that the window wiping robot 100 needs to perform a window wiping task when the dragging of the window wiping robot 100 is stopped.

Further, in some embodiments, a rotation direction and a rotation angle of the window wiping robot 100 may be preset. The preset rotation direction may be a counterclockwise rotation or a clockwise rotation, and in the present embodiment, the specific value of the rotation angle is not limited, and may be any angle of 0° to 360°. For example, the preset rotation angle may be, but is not limited to, 30°, 60°, 90°, 180°, or 360°. Based on this, when determining that the window wiping robot 100 needs to perform a window wiping task, the one or more processors 102 may control the window wiping robot 100 to rotate for a preset angle at a current position in a preset rotation direction. Or, when determining that the window wiping robot 100 needs to perform a window wiping task, the one or more processors 102 may control the window wiping robot 100 to randomly move for a certain distance and rotate for a preset angle at an arrived position in a preset rotation direction. Or, when determining that the window wiping robot 100 needs to perform a window wiping task, the one or more processors 102 may control the window wiping robot 100 to move for a certain distance in a preset moving direction and rotate for a preset angle at an arrived position in a preset rotation direction. The preset moving direction may be forward movement, backward movement, left movement, or right movement, etc. or other moving directions. Further, a movement distance of the window wiping robot 100 may be a preset distance, and the specific value thereof is not limited. A random number may also be generated for the processor 102 according to the current time, and a random distance is determined based on the random number.

In other embodiments, as shown in FIG. 1a, the window wiping robot 100 may further include a boundary detector for detecting a boundary of the glass window to be cleaned during the spinning of the window wiping robot 100. The boundary detector may be provided either inside the machine body 101 or on a surface of the machine body 101. Based on this, the one or more processors 102 detect the state of the boundary detector of the window wiping robot 100 during the spinning of the window wiping robot 100. If the state of the boundary detector changes, it is determined that a first boundary of the glass window to be cleaned is detected. A position of the first boundary is a position on the glass window to be cleaned where the state of the boundary detector changes.

Figure 1L:
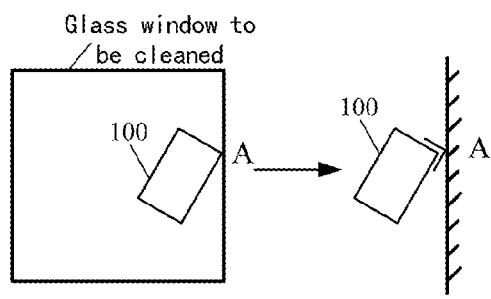
FIGS. 1l and 1m are schematic diagrams showing boundary detection according to an embodiment of the present disclosure.

The boundary detector may be implemented in various forms. For example, the boundary detector may be a guard plate, a ball head, a vision sensor, or a distance sensor, etc. Further, the vision sensor may be a camera, a laser image collector, etc. The distance sensor may be an infrared distance sensor, a laser distance sensor, or an ultrasonic sensor, etc. Depending on the shape of the glass window to be cleaned, the implementation of the boundary detector adapted to the shape of the glass window to be cleaned may vary. The boundary detector is implemented differently, and when the window wiping robot 100 detects the boundary of the glass window to be cleaned, the state change of the boundary detector occurs differently. The following illustrates:

For example, as shown in FIG. 1*l*, the boundary detector is a guard plate of the window wiping robot 100. If a collision occurs on the guard plate during the spinning of the window wiping robot 100, it is determined that a first boundary of the glass window to be cleaned is detected when the collision happens to the guard plate collides. Optionally, when the collision happens on the guard plate, a plate collision signal may be sent to the processor 102, and when the processor 102 detects the plate collision signal, it is determined that a first boundary of the glass window to be cleaned is detected. The guard plate may be, but is not limited to, a plate sensing wheel. The window wiping robot 100 provided with the guard plate is adapted to clean a glass window with a frame. When the guard plate collides with the frame, it may be determined that a certain frame of the glass window to be cleaned is detected. The frame is an implementation form of the first boundary.

Figure 1M:
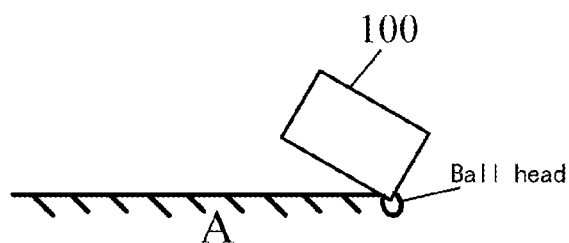

As another example, as shown in FIG. 1*m*, the boundary detector is a ball head of a window wiping robot 100. The ball head includes a body and an outer frame. When the window wiping robot 100 does not touch the boundary of the glass to be cleaned, the body and the outer frame keep buckled. When the window wiping robot 100 touches the boundary of the glass to be cleaned, the body and the outer frame are separated. Based on this, if the body and the outer frame are separated during the spinning of the window wiping robot 100, it may be determined that the first boundary of the glass window to be cleaned is detected. Optionally, a detection mechanism corresponding to the body and the outer frame may send a separation signal to the processor 102 when the body and the outer frame are separated. When the processor 102 detects the separation signal, it is determined that the first boundary of the glass window to be cleaned is detected. The window wiping robot 100 provided with the ball head is adapted to clean a glass window without a frame, such as a glass curtain wall. A gap is provided between the glass curtain walls. When the ball head of the window wiping robot 100 touches the gap between the glass curtain walls, the body and the outer frame are separated, and it may be determined that the gap between the glass curtain walls is detected. The gap is another implementation form of the first boundary.

As another example, if the boundary detector is a vision sensor, the vision sensor continuously collects a surrounding environment image during the spinning of the window wiping robot 100, the processor 102 continuously judges whether the window wiping robot 100 is in contact with the boundary of the glass window to be cleaned according to the environment image collected by the vision sensor, and determines that the window wiping robot 100 detects the first boundary of the glass window to be cleaned if the judgment result is yes. The window wiping robot 100 provided with the vision sensor is adapted to clean various forms of glass windows, such as glass windows with frames or glass curtain walls without frames.

As another example, if the boundary detector is a distance sensor, the distance sensor continuously measures a distance between the window wiping robot 100 and each boundary of the glass window to be cleaned during the spinning of the window wiping robot 100, the processor 102 continuously judges whether the measured distance is smaller than or equal to a preset distance threshold, and it is determined that the first boundary of the glass window to be cleaned is detected by the window wiping robot 100 if the judgment result is yes. The preset distance threshold may be flexibly set according to the measurement accuracy of the distance sensor, and is not limited herein. The window wiping robot 100 provided with the distance sensor is adapted to clean a glass window with a frame.

Figure 1N:
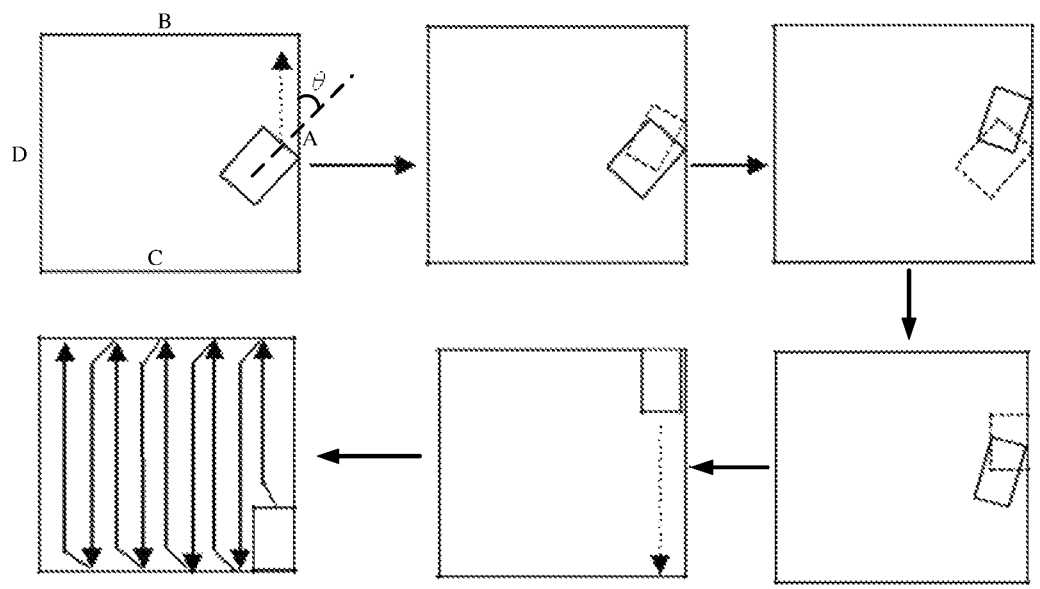
FIGS. 1n and 1o are schematic diagrams showing a cleaning mode of a window wiping robot according to an embodiment of the present disclosure.

Further, as shown in FIG. 1*n*, the one or more processors 102, when controlling the window wiping robot 100 to perform the window wiping task along a first boundary, may control the window wiping robot 100 to adjust a forward direction thereof to be parallel to a first boundary A, and then control the window wiping robot to move forward along the first boundary A in the adjusted forward direction and perform the window wiping task.

Further, considering that the window wiper wiping robot 100 detects the first boundary A, the window wiping robot 100 may not be able to directly adjust the forward direction thereof to be parallel to the first boundary A from a position where the first boundary A is detected due to space limitation. Based on this, in the embodiments of the present disclosure, the one or more processors 102 may also determine an included angle between the forward direction of the window wiping robot 100 and the first boundary A when the first boundary A is detected, and judge whether the included angle is smaller than a preset angle threshold. As shown in FIG. 1*n*, if it is determined that the included angle θ is smaller than the preset angle threshold, the one or more processors 102 control the window wiping robot 100 to differentially adjust the forward direction thereof to be parallel to the first boundary A from the current position. The window wiping robot 100 differentially adjusting the forward direction thereof to be parallel to the first boundary A from the current position means that the window wiping robot 100 turns from the current position to cause the forward direction of the window wiping robot 100 to be parallel to the first boundary A. The turning direction of the window wiping robot 100 is a direction away from the first boundary A. That is, when the window wiping robot 100 turns, a rotation speed of an inner driving wheel is greater than that of an outer driving wheel. That is, the rotation speed of a driving wheel on a side away from the first boundary A is greater than that of a driving wheel on a side close to the first boundary A, thereby achieving differential forward movement.

Figure 1O:
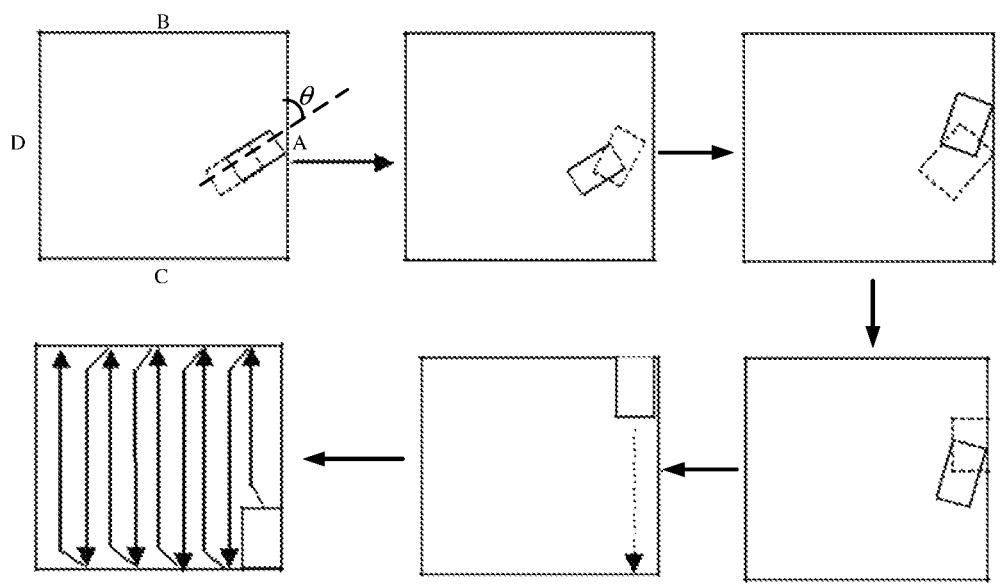

Accordingly, as shown in FIG. 1*o*, if the included angle θ is greater than or equal to the preset angle threshold, the one or more processors 102 may control the window wiping robot 100 to retreat for a certain distance, and control the window wiping robot 100 to differentially adjust the forward direction thereof to be parallel to the first boundary A from an arrived position. The description of the differential mode may be referred to the above content, and will not be repeated herein. Further, a retreating distance of the window wiping robot 100 may be a preset distance, and the specific value thereof is not limited. A random number may also be generated for the processor 102 according to the current time, and a random distance is determined based on the random number.

Optionally, a visual sensor on the window wiping robot 100, such as a camera, may be used to capture an image in front of the window wiping robot 100. The image includes a first boundary A. Then, an included angle between the forward direction of the window wiping robot 100 when the first boundary A is detected and the first boundary A may be calculated according to a capturing angle of the image and an angle of the first boundary A in the image.

Optionally, as shown in FIGS. 1n and 1o, the one or more processors 102 may control the window wiping robot 100 to move forward along the first boundary A in the adjusted forward direction, control the window wiping robot to move reversely along the first boundary A when moving to a second boundary B of the glass window to be cleaned until the window wiping robot 100 moves to a third boundary C of the glass window to be cleaned, and control the window wiping robot 100 to continue to perform the window wiping task in a set cleaning mode from the current position when the window wiping robot 100 moves to the third boundary C. The second boundary B and the third boundary C are opposite, and both are adjacent to the first boundary A. Optionally, the first boundary A, the second boundary B, and the third boundary C may be, but are not limited to, straight boundaries as shown in FIGS. 1n and 1o or arc boundaries (not shown in the figures). Further, the second boundary B and the third boundary C may be perpendicular to the first boundary A, respectively, or the secondary boundary may be at other angles to the third boundary C. The description of the set cleaning mode may be referred to the above related contents, and will not be repeated herein. FIGS. 1n and 1o show that the window wiping task is performed only in the bow-shaped cleaning mode.

Figure 1P:
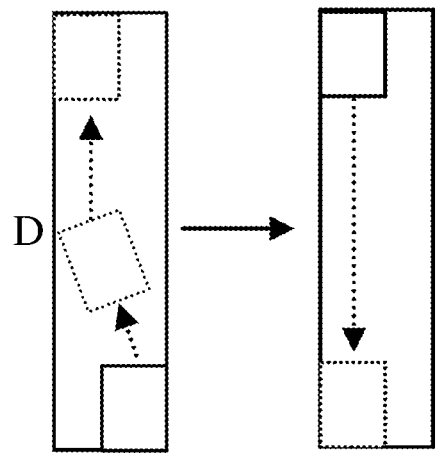
FIG. 1p is a schematic diagram showing another cleaning mode of a window wiping robot according to an embodiment of the present disclosure.

Further, the one or more processors 102 also detect a distance between the window wiping robot 100 and a fourth boundary D of the glass window to be cleaned while controlling the window wiping robot to continue to perform the window wiping task in the set cleaning mode. Further, as shown in FIG. 1p, when the distance between the window wiping robot 100 and the fourth boundary D is smaller than a width of the window wiping robot 100, the window wiping robot 100 is controlled to differentially travel to the fourth boundary D, and the window wiping robot 100 is controlled to continue to perform the window wiping task along the fourth boundary D in a forward direction parallel to the fourth boundary D. The width of the window wiping robot 100 refers to the longest line on each connecting line perpendicular to the forward direction of the window wiping robot 100. The fourth boundary D is opposite to the first boundary A. Optionally, the fourth boundary D may be, but is not limited to, a straight boundary as shown in FIG. 1p or an arc boundary (not shown in the figure). Further, the fourth boundary D may be perpendicular to the second boundary B and the third boundary C, respectively, or may have other angles, which will not be enumerated herein.

Figure 1Q:
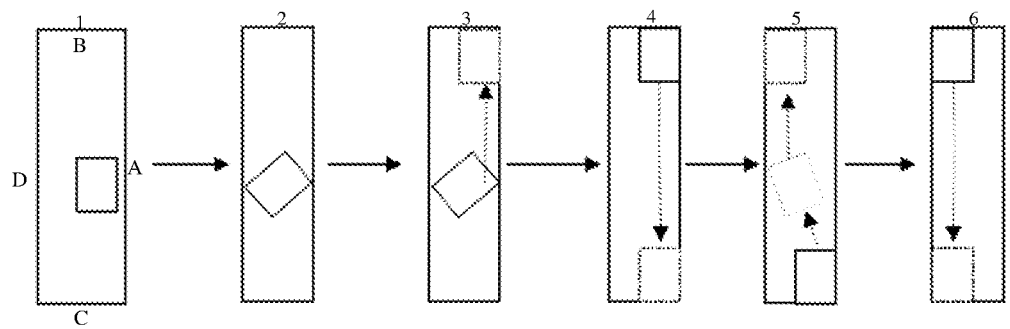
FIG. 1q is a schematic diagram showing yet another cleaning mode of a window wiping robot according to an embodiment of the present disclosure.
Figure 2:
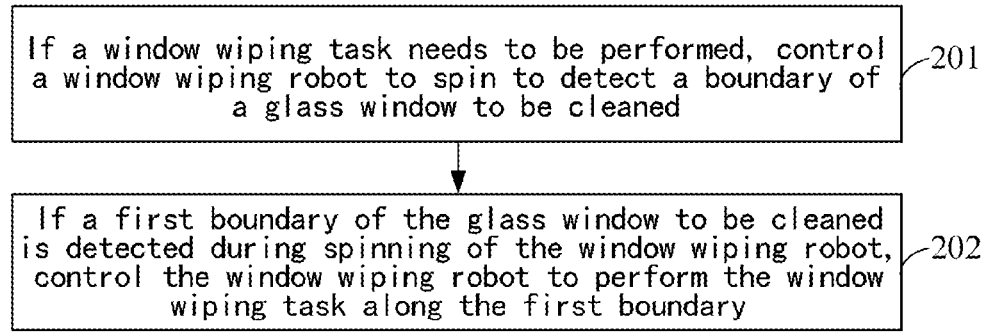
FIG. 2 is a flow diagram of a cleaning method according to an embodiment of the present disclosure.

Further, for a narrow glass window having a width greater than the width of the window wiping robot 100, but less than twice the width of the window wiping robot 100, as shown in FIG. 1q, the window wiping robot 100 performs the window wiping task as follows:

In step 1, when the window wiping robot 100 determines that a window wiping task needs to be performed, the one or more processors 102 control the window wiping robot 100 to spin, and the window wiping robot 100 detects a first boundary A of a glass window to be cleaned during the spinning process. (As shown in FIGS. 1 and 2 in FIG. 1q)

In step 2, the one or more processors 102 may control the window wiping robot 100 to move forward along the first boundary A in the adjusted forward direction, and control the window wiping robot to move reversely along the first boundary A when moving to a second boundary B of the glass window to be cleaned until the window wiping robot 100 moves to a third boundary C of the glass window to be cleaned. (As shown in FIGS. 3 and 4 in FIG. 1q)

In step 3, when the window wiping robot 100 moves to the third boundary C, the one or more processors 102 control the window wiping robot 100 to differentially travel to a fourth boundary D, and control the window wiping robot 100 to continue to perform the window wiping task along the fourth boundary D in a forward direction parallel to the fourth boundary D. (As shown in FIGS. 5 and 6 in FIG. 1q)

It should be noted that in FIGS. 1l to 1q, only a top view shape of the window wiping robot 100 is illustrated as a rectangle, but the appearance and shape thereof are not limited.

In addition to the above window wiping robot, the embodiments of the present disclosure also provide a cleaning method that is exemplified below from the perspective of a processor on the window wiping robot.

FIG. 2 is a flow diagram of a cleaning method according to an embodiment of the present disclosure. As shown in FIG. 2, the method includes the following steps.

At 201, if a window wiping task needs to be performed, a window wiping robot is controlled to spin to detect a boundary of a glass window to be cleaned.

At 202, if a first boundary of the glass window to be cleaned is detected during spinning of the window wiping robot, the window wiping robot is controlled to perform the window wiping task along the first boundary.

In the present embodiment, the window wiping robot may move autonomously and perform a window wiping task on the basis of the autonomous movement. The description about the implementation form and appearance form of the window wiping robot may be referred to the related contents of the above embodiments. In step 201, when a window wiping robot needs to perform a window wiping task, the window wiping robot is controlled to spin to detect a boundary of glass to be cleaned. Further, if the window wiping robot detects the boundary of the glass to be cleaned during spinning, the window wiping robot is controlled to perform the window wiping task along the detected boundary in step 202. In the embodiments of the present disclosure, for ease of description and distinction, the boundary of the glass to be cleaned, which is detected by the window wiping robot during spinning, is defined as a first boundary. The definition of the first boundary and the description of the window wiping robot performing the window wiping task along the detected first boundary may be referred to the above contents, and will not be repeated herein.

Accordingly, if the window wiping robot does not detect a first boundary of the glass window to be cleaned during spinning, the processor on the window wiping robot controls the window wiping robot to perform the window wiping task in a set cleaning mode in any direction. In the embodiments of the present disclosure, the cleaning mode means that the window wiping robot performs the window wiping task according to a set cleaning route. The cleaning mode includes: at least one of a bow-shaped cleaning mode (shown in FIGS. 1f and 1g), a "Z"-shaped cleaning mode (shown in FIG. 1h), an "N"-shaped cleaning mode (shown in FIG. 1i), a hollow square-shaped cleaning mode (shown in FIG. 1j), and an arc-shaped cleaning mode (shown in FIG. 1k).

In the present embodiment, when a window wiping task needs to be performed, the window wiping robot firstly spins to detect a boundary of a glass window to be cleaned. If the boundary of the glass window to be cleaned is detected during spinning, the window wiping robot performs the window wiping task directly along the boundary. The cleaning mode can save the boundary detection time and help to improve the cleaning efficiency when starting to perform the window wiping task without detecting the boundary up, down, left, and right.

It should be noted that different implementations may be used to determine whether the window wiping robot needs to perform the window wiping task for different application scenarios. Some common application scenarios are exemplified below.

In Application Scenario 1, the processor of the window wiping robot determines that a window wiping task needs to be performed upon detecting a power-on instruction.

In Application Scenario 2, the processor of the window wiping robot determines that a window wiping task needs to be performed upon detecting a restart instruction.

In Application Scenario 3, the processor of the window wiping robot determines that the window wiping robot needs to perform a window wiping task upon detecting that the window wiping robot is re-placed onto the glass window. A specific implementation of how to determine that the window wiping robot is re-placed onto the glass window may be referred to the related contents of the above embodiments regarding Application Scenario 3, and will not be repeated herein.

Further, in some embodiments, a rotation direction and a rotation angle of the window wiping robot 100 may be preset. The preset rotation direction may be a counterclockwise rotation or a clockwise rotation, and in the present embodiment, the specific value of the rotation angle is not limited, and may be any angle of 0° to 360°. For example, the preset rotation angle may be, but is not limited to, 30°, 60°, 90°, 180°, or 360°. Based on this, an implementation of step 201 is as follows. When it is determined that the window wiping robot needs to perform a window wiping task, the window wiping robot may be controlled to rotate for a preset angle at a current position in a preset rotation direction. Or, when it is determined that the window wiping robot needs to perform a window wiping task, the window wiping robot may be controlled to randomly move for a certain distance and rotate for a preset angle at an arrived position in a preset rotation direction. Or, when it is determined that the window wiping robot needs to perform a window wiping task, the window wiping robot may be controlled to move for a certain distance in a preset moving direction and rotate for a preset angle at an arrived position in a preset rotation direction. The preset moving direction may be forward movement, backward movement, left movement, or right movement, etc. or other moving directions.

In other embodiments, the window wiping robot may further include a boundary detector for detecting a boundary of the glass window to be cleaned during the spinning of the window wiping robot. The boundary detector may be provided either inside the machine body or on a surface of the machine body. Based on this, the state of the boundary detector of the window wiping robot may be detected during the spinning of the window wiping robot. If the state of the boundary detector changes, it is determined that a first boundary of the glass window to be cleaned is detected. A position of the first boundary is a position on the glass window to be cleaned where the state of the boundary detector changes.

Further, the boundary detector may be implemented in various forms. For example, the boundary detector may be a guard plate, a ball head, a vision sensor, or a distance sensor, etc. Further, the vision sensor may be a camera, a laser image collector, etc. The distance sensor may be an infrared distance sensor, a laser distance sensor, or an ultrasonic sensor, etc. Depending on the shape of the glass window to be cleaned, the implementation of the boundary detector adapted to the shape of the glass window to be cleaned may vary. The boundary detector is implemented differently, and when the window wiping robot detects the boundary of the glass window to be cleaned, the state change of the boundary detector occurs differently. The following illustrates:

For example, as shown in FIG. 1l, the boundary detector is a guard plate of the window wiping robot. If a collision occurs on the guard plate during the spinning of the window wiping robot, it is determined that a first boundary of the glass window to be cleaned is detected when the collision happens to the guard plate collides. Optionally, when the collision happens on the guard plate, a plate collision signal may be sent to the processor, and when the processor detects the plate collision signal, it is determined that a first boundary of the glass window to be cleaned is detected. The guard plate may be, but is not limited to, a plate sensing wheel. The window wiping robot 100 provided with the guard plate is adapted to clean a glass window with a frame. When the guard plate collides with the frame, it may be determined that a certain frame of the glass window to be cleaned is detected. The frame is an implementation form of the first boundary.

As another example, as shown in FIG. 1m, the boundary detector is a ball head of a window wiping robot. The ball head includes a body and an outer frame. When the window wiping robot does not touch the boundary of the glass to be cleaned, the body and the outer frame keep buckled. When the window wiping robot touches the boundary of the glass to be cleaned, the body and the outer frame are separated. Based on this, if the body and the outer frame are separated during the spinning of the window wiping robot, it may be determined that the first boundary of the glass window to be cleaned is detected. Optionally, a detection mechanism corresponding to the body and the outer frame may send a separation signal to the processor when the body and the outer frame are separated. When the processor detects the separation signal, it is determined that the first boundary of the glass window to be cleaned is detected. The window wiping robot provided with the ball head is adapted to clean a glass window without a frame, such as a glass curtain wall. A gap is provided between the glass curtain walls. When the ball head of the window wiping robot touches the gap between the glass curtain walls, the body and the outer frame are separated, and it may be determined that the gap between the glass curtain walls is detected. The gap is another implementation form of the first boundary.

As another example, if the boundary detector is a vision sensor, the vision sensor continuously collects a surrounding environment image during the spinning of the window wiping robot, the processor continuously judges whether the window wiping robot is in contact with the boundary of the glass window to be cleaned according to the environment image collected by the vision sensor, and determines that the window wiping robot detects the first boundary of the glass window to be cleaned if the judgment result is yes. The window wiping robot provided with the vision sensor is adapted to clean various forms of glass windows, such as glass windows with frames or glass curtain walls without frames.

As another example, if the boundary detector is a distance sensor, the distance sensor continuously measures a distance between the window wiping robot and each boundary of the glass window to be cleaned during the spinning of the window wiping robot, the processor continuously judges whether the measured distance is smaller than or equal to a preset distance threshold, and it is determined that the first boundary of the glass window to be cleaned is detected by the window wiping robot if the judgment result is yes. The preset distance threshold may be flexibly set according to the measurement accuracy of the distance sensor, and is not limited herein. The window wiping robot provided with the distance sensor is adapted to clean a glass window with a frame.

Further, as shown in FIG. 1n, an optional implementation of controlling the window wiping robot to perform the window wiping task along a first boundary is as follows. The window wiping robot is controlled to adjust a forward direction thereof to be parallel to a first boundary A, and then the window wiping robot is controlled to move forward along the first boundary A in the adjusted forward direction and perform the window wiping task.

Further, considering that the window wiper wiping robot detects the first boundary A, the window wiping robot may not be able to directly adjust the forward direction thereof to be parallel to the first boundary A from a position where the first boundary A is detected due to space limitation. Based on this, an optional implementation of controlling the window wiping robot to adjust a forward direction thereof to be parallel to a first boundary A is as follows. An included angle between the forward direction of the window wiping robot and the first boundary A when the first boundary A is detected is determined, and it is judged whether the included angle is smaller than a preset angle threshold. As shown in FIG. 1n, if it is determined that the included angle θ is smaller than the preset angle threshold, the window wiping robot is controlled to differentially adjust the forward direction thereof to be parallel to the first boundary A from the current position. The explanation of how the window wiping robot differentially adjusts the forward direction thereof to be parallel to the first boundary A from the current position and the specific implementation of determining the included angle between the forward direction of the window wiping robot and the first boundary A when the first boundary A is detected may be referred to the related contents of the above embodiments, and will not be repeated herein.

Accordingly, as shown in FIG. 1o, if the included angle θ is greater than or equal to the preset angle threshold, the window wiping robot is controlled to retreat for a certain distance, and control the window wiping robot to differentially adjust the forward direction thereof to be parallel to the first boundary A from an arrived position. The description of the differential mode may be referred to the above content, and will not be repeated herein.

Optionally, as shown in FIGS. 1n and 1o, the processor may control the window wiping robot to move forward along the first boundary A in the adjusted forward direction, control the window wiping robot to move reversely along the first boundary A when moving to a second boundary B of the glass window to be cleaned until the window wiping robot moves to a third boundary C of the glass window to be cleaned, and control the window wiping robot to continue to perform the window wiping task in a set cleaning mode from the current position when the window wiping robot moves to the third boundary C. The second boundary B and the third boundary C are opposite, and both are adjacent to the first boundary A. The shape of the first boundary A, the second boundary B, and the third boundary C and the set cleaning mode may be described with reference to the above contents, and will not be repeated herein.

Further, the processor also detects a distance between the window wiping robot and a fourth boundary D of the glass window to be cleaned while controlling the window wiping robot to continue to perform the window wiping task in the set cleaning mode. Further, as shown in FIG. 1p, when the distance between the window wiping robot and the fourth boundary D is smaller than a width of the window wiping robot, the window wiping robot is controlled to differentially travel to the fourth boundary D, and the window wiping robot is controlled to continue to perform the window wiping task along the fourth boundary D in a forward direction parallel to the fourth boundary D. The width of the window wiping robot refers to the longest line on each connecting line perpendicular to the forward direction of the window wiping robot. The fourth boundary D is opposite to the first boundary A. Optionally, the description of the shape of the fourth boundary D may be referred to the above related contents, and will not be repeated herein.

Further, for a narrow glass window having a width greater than the width of the window wiping robot, but less than twice the width of the window wiping robot, an implementation of the window wiping robot performing the window wiping task may be described with reference to steps 1 to 3 above in conjunction with FIG. 1q, and will not be repeated herein.

Accordingly, the embodiments of the present disclosure also provide a computer-readable storage medium, storing computer instructions. The computer instructions, when executed by one or more processors, cause the one or more processors to perform actions including: if a window wiping task needs to be performed, controlling a window wiping robot to spin to detect a boundary of a glass window to be cleaned; and if a first boundary of the glass window to be cleaned is detected during spinning of the window wiping robot, controlling the window wiping robot to perform the window wiping task along the first boundary.

In some optional embodiments, the one or more processors also perform the operations of the above cleaning method, which may specifically be referred to the related contents of the above method embodiments and will not be repeated herein.

It should be noted that the execution subjects of the steps of the method provided by the above embodiments may all be the same device, or the method may also be performed by different devices. For example, the execution subject of steps 201 and 202 may be device A. As another example, the execution subject of step 201 may be a device A, and the execution subject of step 202 may be a device B, etc.

In addition, in some of the processes described in above mentioned embodiments and drawings, a plurality of operations occurring in a particular order are included, which may be performed out of the order herein or be performed in parallel. The sequence numbers of the operations, such as 201, 202, etc., are merely used to distinguish between the various operations, and the sequence numbers themselves do not represent any order of execution. In addition, the processes may include more or fewer operations, and the operations may be performed sequentially or in parallel. It should be noted that the expressions herein of "first", "second", etc. are intended to distinguish between different messages, devices, modules, etc., and are not intended to represent a sequential order, nor is it intended to limit that "first" and "second" are of different types.

Those skilled in the art should know that the embodiment of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media (including, but not limited to, a disk memory, a Compact Disc Read-Only Memory (CD-ROM) and an optical memory) including computer-available program codes.

The present disclosure is described with reference to flowcharts and/or block diagrams of the method, a device (system) and computer program product according to the embodiment of the present disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction apparatus may be generated by the instructions stored in the computer-readable memory, the instruction apparatus realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

In a typical configuration, a computing device includes one or more processors (CPUs), an input/output interface, a network interface, and a memory.

The memory may include a non-permanent memory, a random access memory (RAM), and/or a non-volatile memory in a computer-readable medium, such as a read-only memory (ROM) or a flash RAM. The memory is an example of a computer-readable medium.

The computer-readable medium includes permanent and non-permanent, mobile and non-mobile media, which may implement information storage by any method or technology. The information may be a computer-readable instruction, a data structure, a program module, or other data. Examples of computer storage media include, but are not limited to, a phase change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disk (DVD) or other optical memories, a magnetic tape cartridge, a magnetic tape storage device or other magnetic storage devices or any other non-transmission media, which may be used to store information accessible by a computing device. As defined herein, the computer-readable medium does not include non-transitory computer-readable media such as modulated data signals and carrier waves.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A cleaning method, comprising:
   if a window wiping task needs to be performed, controlling a window wiping robot to spin to detect a boundary of a glass window to be cleaned; and
   if a first boundary of the glass window to be cleaned is detected during spinning of the window wiping robot, controlling the window wiping robot to perform the window wiping task along the first boundary;
   wherein the controlling the window wiping robot to spin comprises:
   controlling the window wiping robot to randomly move for a certain distance and rotate for a preset angle at an arrived position in a preset rotation direction.

2. The method according to claim 1, wherein prior to the controlling the window wiping robot to spin, the method further comprises:
   when detecting a power-on instruction, determining that the window wiping task needs to be performed; or,
   when detecting that the window wiping robot is re-placed onto the glass window, determining that the window wiping task needs to be performed.

3. The method according to claim 2, wherein the controlling the window wiping robot to perform the window wiping task along the first boundary comprises:
   controlling the window wiping robot to adjust a forward direction to be parallel to the first boundary; and
   controlling the window wiping robot to move forward along the first boundary in the adjusted forward direction to perform the window wiping task.

4. The method according to claim 2, further comprising:
   if the first boundary of the glass window to be cleaned is not detected during spinning of the window wiping robot, controlling the window wiping robot to perform the window wiping task in a set cleaning mode in any direction.

5. The method according to claim 1, further comprising:
monitoring a state of a boundary detector of the window wiping robot during the spinning of the window wiping robot; and
if the state of the boundary detector changes, determining that a first boundary of the glass window to be cleaned is detected,
wherein a position of the first boundary is a position on the glass window to be cleaned where the state of the boundary detector changes.

6. The method according to claim 5, wherein,
the boundary detector is a ball head of the window wiping robot, the ball head comprises a body and an outer frame, and when the body and the outer frame are separated, determining that a first boundary of the glass window to be cleaned is detected.

7. The method according to claim 6, wherein the controlling the window wiping robot to perform the window wiping task along the first boundary comprises:
controlling the window wiping robot to adjust a forward direction to be parallel to the first boundary; and
controlling the window wiping robot to move forward along the first boundary in the adjusted forward direction to perform the window wiping task.

8. The method according to claim 5, wherein the controlling the window wiping robot to perform the window wiping task along the first boundary comprises:
controlling the window wiping robot to adjust a forward direction to be parallel to the first boundary; and
controlling the window wiping robot to move forward along the first boundary in the adjusted forward direction to perform the window wiping task.

9. The method according to claim 5, further comprising:
if the first boundary of the glass window to be cleaned is not detected during spinning of the window wiping robot, controlling the window wiping robot to perform the window wiping task in a set cleaning mode in any direction.

10. The method according to claim 5, wherein,
the boundary detector is a guard plate of the window wiping robot, and when a collision happened on the guard plate, determining that a first boundary of the glass window to be cleaned is detected.

11. The method according to claim 1, wherein the controlling the window wiping robot to perform the window wiping task along the first boundary comprises:
controlling the window wiping robot to adjust a forward direction to be parallel to the first boundary; and
controlling the window wiping robot to move forward along the first boundary in the adjusted forward direction to perform the window wiping task.

12. The method according to claim 11, wherein the controlling the window wiping robot to adjust the forward direction to be parallel to the first boundary comprises:
determining an included angle between the forward direction of the window wiping robot and the first boundary;
if the included angle is smaller than a preset angle threshold, controlling the window wiping robot to differentially adjust the forward direction to be parallel to the first boundary from a current position; or
if the included angle is greater than or equal to a preset angle threshold, controlling the window wiping robot to retreat for a certain distance, and controlling the window wiping robot to differentially adjust the forward direction to be parallel to the first boundary from an arrived position.

13. The method according to claim 11, wherein the controlling the window wiping robot to move forward along the first boundary in the adjusted forward direction to perform the window wiping task comprises:
controlling the window wiping robot to move forward along the first boundary in the adjusted forward direction, and when moving to a second boundary of the glass window to be cleaned, controlling the window wiping robot to move reversely along the first boundary; and
when moving to a third boundary of the glass window to be cleaned, controlling the window wiping robot to continue to perform the window wiping task in a set cleaning mode from a current position;
wherein the second boundary and the third boundary are opposite, and both are adjacent to the first boundary.

14. The method according to claim 13, further comprising:
detecting a distance between the window wiping robot and a fourth boundary of the glass window to be cleaned, while continuing to perform the window wiping task in the set cleaning mode, wherein the fourth boundary of the glass window to be cleaned is opposite to the first boundary; and
when the distance is smaller than a width of the window wiping robot, controlling the window wiping robot to differentially travel to the fourth boundary, and controlling the window wiping robot to continue to perform the window wiping task along the fourth boundary in a forward direction parallel to the fourth boundary.

15. The method according to claim 14, wherein the set cleaning mode comprises at least one of the following:
a bow-shaped cleaning mode, a "Z"-shaped cleaning mode, a "N"-shaped cleaning mode, a hollow square-shaped cleaning mode, and an arc-shaped cleaning mode.

16. The method according to claim 1, further comprising:
if the first boundary of the glass window to be cleaned is not detected during spinning of the window wiping robot, controlling the window wiping robot to perform the window wiping task in a set cleaning mode in any direction.

17. The method according to claim 1, wherein the controlling the window wiping robot to perform the window wiping task along the first boundary comprises:
controlling the window wiping robot to adjust a forward direction to be parallel to the first boundary; and
controlling the window wiping robot to move forward along the first boundary in the adjusted forward direction to perform the window wiping task.

18. The method according to claim 1, further comprising:
if the first boundary of the glass window to be cleaned is not detected during spinning of the window wiping robot, controlling the window wiping robot to perform the window wiping task in a set cleaning mode in any direction.

19. A window wiping robot, comprising: a machine body, wherein the machine body is provided with one or more processors and one or more memories for storing computer instructions, wherein,
the one or more processors are configured to execute the computer instructions for:

if a window wiping task needs to be performed, controlling a window wiping robot to spin to detect a boundary of a glass window to be cleaned; and if a first boundary of the glass window to be cleaned is detected during spinning of the window wiping robot, controlling the window wiping robot to perform the window wiping task along the first boundary;

wherein the controlling the window wiping robot to spin comprises:

controlling the window wiping robot to randomly move for a certain distance and rotate for a preset angle at an arrived position in a preset rotation direction.

20. A computer-readable storage medium storing computer instructions, wherein the computer instructions, when executed by one or more processors, cause the one or more processors to perform actions comprising:

if a window wiping task needs to be performed, controlling a window wiping robot to spin to detect a boundary of a glass window to be cleaned; and if a first boundary of the glass window to be cleaned is detected during spinning of the window wiping robot, controlling the window wiping robot to perform the window wiping task along the first boundary;

wherein the controlling the window wiping robot to spin comprises:

controlling the window wiping robot to randomly move for a certain distance and rotate for a preset angle at an arrived position in a preset rotation direction.

21. A cleaning method, comprising:

if a window wiping task needs to be performed, controlling a window wiping robot to spin to detect a boundary of a glass window to be cleaned; and if a first boundary of the glass window to be cleaned is detected during spinning of the window wiping robot, controlling the window wiping robot to perform the window wiping task along the first boundary;

wherein the window wiping robot comprises a cleaning component for performing cleaning, and a driving component for driving the window wiping robot to move including a universal wheel, or a Mecanum wheel.

* * * * *